United States Patent
Muramatsu et al.

(10) Patent No.: US 6,933,841 B2
(45) Date of Patent: Aug. 23, 2005

(54) APPARATUS FOR ASSISTING SIMPLE RECOGNITION OF A POSITION AND PROGRAM FOR ASSISTING SIMPLE RECOGNITION OF A POSITION

(75) Inventors: Harushi Muramatsu, Shizouka (JP); Hiroki Oishi, Shizuoka (JP)

(73) Assignee: Yazaki Corporation, Tokyo (JP)

(*) Notice: Subject to any disclaimer, the term of this patent is extended or adjusted under 35 U.S.C. 154(b) by 39 days.

(21) Appl. No.: 10/422,729

(22) Filed: Apr. 25, 2003

(65) Prior Publication Data

US 2003/0201913 A1 Oct. 30, 2003

(30) Foreign Application Priority Data

Apr. 26, 2002 (JP) .................................... 2002-126127

(51) Int. Cl.⁷ ........................... G08B 1/08; G08G 1/123
(52) U.S. Cl. ........................... 340/539.13; 340/995.24; 340/995.12; 701/200; 455/414.2
(58) Field of Search ................. 340/995.24, 539.13, 340/995.12; 701/200, 201, 208, 209, 211, 212, 213; 455/412.1, 414.1, 414.2, 414.3

(56) References Cited

U.S. PATENT DOCUMENTS 5,555,446 A * 9/1996 Jasinski .................. 340/7.21
6,452,597 B1 * 9/2002 Goldberg et al. ........... 345/472
6,687,608 B2 * 2/2004 Sugimoto et al. ........... 701/207

* cited by examiner

Primary Examiner—Donnie L. Crosland
(74) Attorney, Agent, or Firm—Armstrong, Kratz, Quintos, Hanson & Brooks, LLP

(57) ABSTRACT

An apparatus for assisting simple recognition of a position to make simple recognition of a position of an object including a processor which stores place-name information corresponding to each position, fetches position information to show the current position of the object, selects the place-name information corresponding to the fetched position information generates assistant information to display the selected place name information and outputs the assistant information.

6 Claims, 4 Drawing Sheets

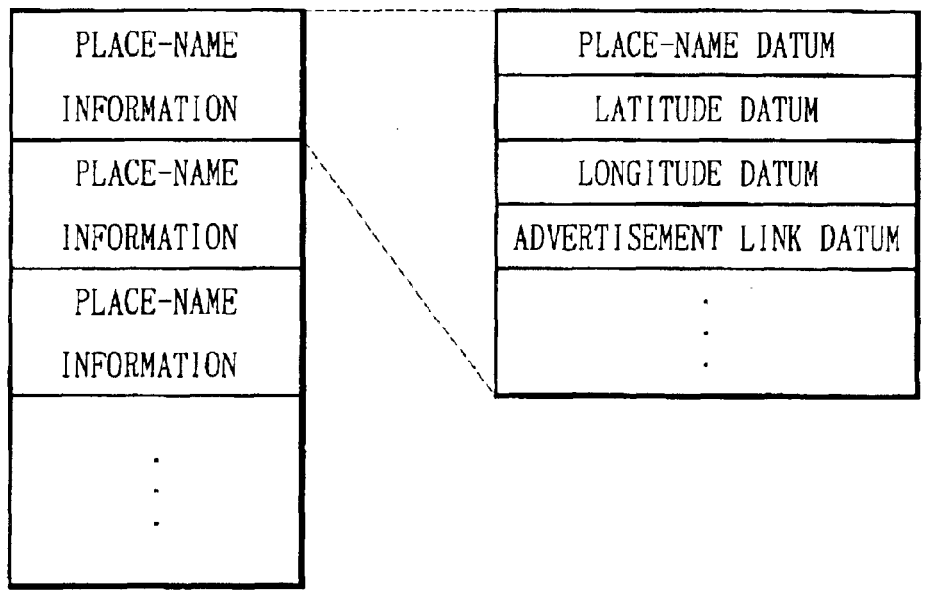
FIG. 4
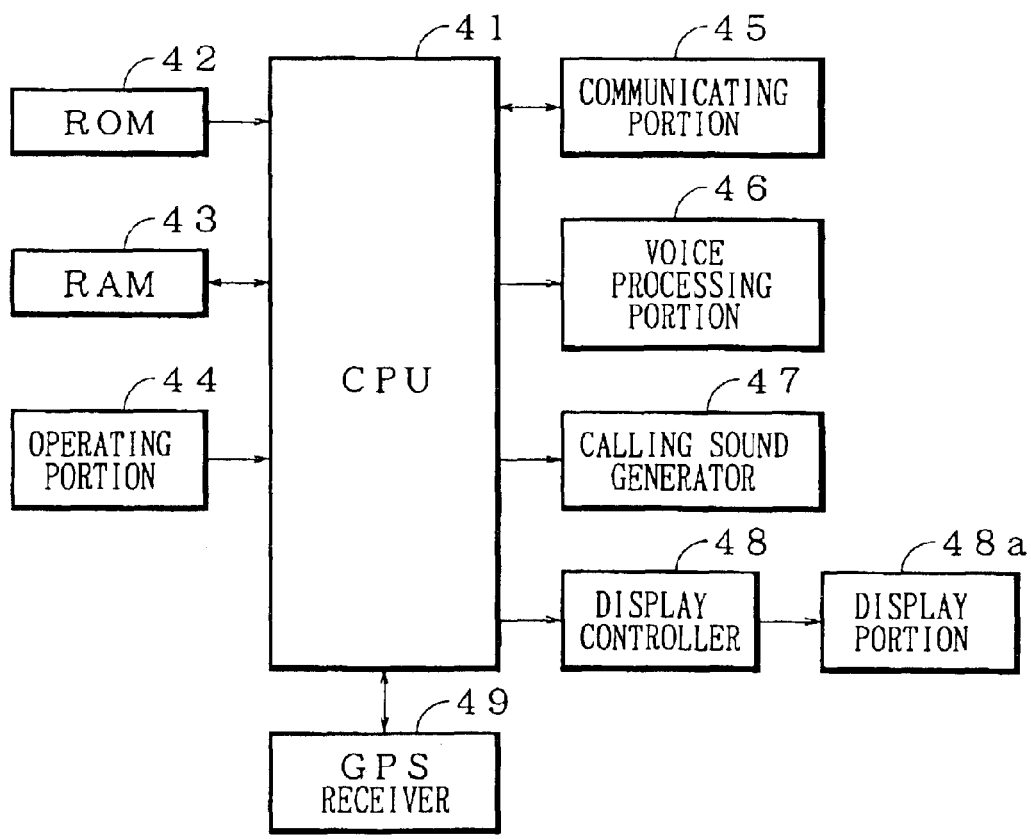

APPARATUS FOR ASSISTING SIMPLE RECOGNITION OF A POSITION AND PROGRAM FOR ASSISTING SIMPLE RECOGNITION OF A POSITION

BACKGROUND OF THE INVENTION

1. Field of the Invention

The present invention relates to an apparatus for assisting simple recognition of a position and a program for assisting simple recognition of a position and, more specifically, to an apparatus for assisting simple recognition of a position to assist simple recognition of a current position of an object and a program for assisting simple recognition of a position, for operating a computer to assist simple recognition of a current position of an object.

2. Description of the Related Art

GPS (Global Positioning System) is popularly applied to not only ships but also navigation systems for cars, cellular phones and other mobile phones. An apparatus having a GPS receiver receives radio waves radiated from more than three GPS satellites and calculates a current position by measured times of the radio waves reaching from the GPS satellites to the GPS receiver.

Cellular phone or another mobile phone of a PDC (Personal Digital Cellular) system supplies position information service to inform a position of a phone terminal by using a base station communicating with the terminal by a radio wave. The position information service supplies more precious position information by using both information of GPS satellites and a cellular phone network to complement each other. For example, when the terminal exists in a building or a basement and a radio wave from a GPS satellite is blocked off, the system can estimate the current position.

There is a service to display a map image indicating a current position of a vehicle on a display of a cellular phone, the current position being measured by a GPS receiver installed in the vehicle and information of the position being transmitted by radio transmitter installed in the vehicle.

For displaying a map image, on which a cursor for pointing the current position is superimposed, in a cellular phone, the cellular phone has to receive the map image having a large data volume so that communication cost will be increased. Some users, those who are not good at reading maps or do not have the find of the place feel it difficult to recognize the current position by the map image and inform the current position to the other person. Furthermore, when a display size of the cellular phone is too small to recognize the current position by the map image displayed on the phone, the other map image by different map scale is requested for displaying that on the phone so that communication cost shall be further increased.

To overcome the above drawback of a usual apparatus for assisting recognition of a position, one object of the present invention is to provide an apparatus for assisting simple recognition of a position and a program for assisting simple recognition of a position for operating a computer to assist recognizing easily a current position of an object.

SUMMARY OF THE INVENTION

In order to attain the above objects, an apparatus for assisting simple recognition of a position according to the present invention, to assist simple recognition of a current position of an object, includes place-name information storage means $10d1$ for storing a place-name information to indicate a place name corresponding to an each position, position information fetch means $10a1$ for fetching position information to show the current position of the object sensed at an outside of the apparatus, place-name information select means $10a2$ for selecting the place-name information corresponding to the position information fetched by the position information fetch means $10a1$ from the place-name information storage means $10d1$, assistant information generating means $10a3$ for generating assistant information to display the place-name information selected by the place-name information select means $10a2$ and assistant information output means $10a4$ for outputting the assistant information generated by the assistant information generating means $10a3$ to display the place-name information.

In the apparatus for assisting simple recognition of a position mentioned above, the place-name information to indicate the place name corresponding to the each position is stored in the place-name information storage means $10d1$. When position information of the object, such as a cellular phone or an on-vehicle device, sensed at an outside of the apparatus is fetched by the position information fetch means $10a1$, the place-name information corresponding to the position information is selected from the place-name information storage means $10d1$ by the place-name information select means $10a2$. Thereafter, the assistant information to display the selected place-name information is generated by the assistant information generating means $10a3$ and the assistant information is outputted toward, for example, a communication device to display the place name information by assistant information output means $10a4$. Thus, selecting the place-name information corresponding to the position information sensed outside of the apparatus, generating the assistant information to display the selected place-name information, and outputting the assistant information to display the place-name information on a mobile terminal, such as a cellular phone, a user can recognize the current position by the place name to look the displayed place name. Especially, some users having the feel of the place, i.e., requiring no display of a map, can recognize the position of the object swiftly by the place name. Furthermore, the assistant information generated with the place name has a small data volume so that there is no issue of increasing communication cost. Regarding even a cellular phone with a small display, the current position can be easily recognized by the place name. Thus, the position of the object can be recognized easily by the place name having a small data volume, so that increasing of a communication cost can be prevented. The data volume to display the place name is smaller than the data volume to display a map image, so that response time to display information correspondingly to a request by a user can be shortened.

The apparatus for assisting simple recognition of a position according to the present invention, as shown in a basic diagram of FIG. 1, is further specified by that map-information request means $10a5$ for requesting map information corresponding to the position, shown by said position information fetched by said position information fetch means $10a$, from a map-information server 20 for supplying the map information to display a map is provided and said assistant information generating means $10a3$ generate the assistant information to display the map information supplied by said map-information server 20 in accordance with request by said map-information request means $10a5$, correspondingly to an order from the outside of the apparatus.

In the apparatus for assisting simple recognition of a position mentioned above, when the position information is fetched by the position information fetch means $10a1$, the map information corresponding to the position information is requested by map-information request means 10a5 from a map-information server 20. The assistant information is generated by the assistant information generating means 10a3 to display the map information supplied by the map-information server 20 in accordance with request by the map-information request means 10a5, correspondingly to an order from the outside of the apparatus. Thus, the assistant information is generated to display the map information supplied by the map-information server 20, so that, when some users having no feel of the place or cannot recognize the position only by the place name, the map information corresponding to the position can be displayed. Therefore, users can recognize the position more securely. Furthermore, using the map information supplied by the map-information server 20, the apparatus for assisting simple recognition of a position is not required to manage the map information and the apparatus can be structured easily.

The apparatus for assisting simple recognition of a position according to the present invention, as shown in the basic diagram of FIG. 1, is further specified by that advertisement information storage means 10d2 for storing advertisement information to indicate a requested advertisement related to the place-name information stored in the place-name information storage means 10d is further provided, and the assistant information generating means 10a3 generate the assistant information to display the advertisement information related to the place-name information.

In the apparatus for assisting simple recognition of a position mentioned above, the advertisement information to indicate a requested advertisement is stored in relation to the place-name information in the advertisement information storage means 10d2. The assistant information is generated by the assistant information generating means to display the advertisement information related to the selected place-name information and the assistant information is outputted toward, for example, a communication device by assistant information output means 10a4 to display the advertisement information. Thus, generating the assistant information to display the advertisement information related to the place-name information, the advertisement information can be displayed on a mobile terminal, such as a cellular phone, so that advertisement rates can be given from an advertiser. Applying a name of a building or a company to the advertisement information and displaying the advertisement information, some users can swiftly recognize the position by the advertisement information without display of a map. Thus, the advertisement information can assist users to recognize a position and the advertisement rates may reduce communication expenses for users.

In order to attain the objects, a program for assisting simple recognition of a position according to the present invention is to operate a computer to assist simple recognition of a current position of an object, and functions position information fetch means for fetching position information to show the current position of the object sensed outside of the computer, place-name information select means for selecting place-name information corresponding to the position information fetched by said position information fetch means from the place-name information to indicate a place name corresponding to an each position, assistant information generating means for generating assistant information to display the place-name information selected by the place-name information select means, and assistant information output means for outputting the assistant information generated by the assistant information generating means to display the place name information.

By executing the program for assisting simple recognition of a position mentioned above, when the computer fetches position information of the object, such as a cellular phone or an on-vehicle device, sensed outside of the computer, the computer selects the place-name information corresponding to the position information from the place-name information. Thereafter, the assistant information to display the selected place-name information is generated and the assistant information is outputted toward, for example, a communication device to display the place name information on a mobile terminal, such as a cellular phone, of a user. Thus, by executing the program for assisting simple recognition of a position on the computer, selecting the place-name information corresponding to the position information sensed at an outside of the computer, generating the assistant information to display the selected place-name information, and outputting the assistant information to display the place-name information on a mobile terminal, such as a cellular phone, a user can recognize the current position by the place name to look the displayed place name. Especially, some users having the feel of the place, i.e., requiring no display of a map, can recognize the position of the object swiftly by the place name. Furthermore, the assistant information generated with the place name has a small data volume so that there is no issue of increasing communication cost. Regarding even a cellular phone with a small display, the current position can be easily recognized by the place name. Thus, displaying the place-name information by the assistant information generated by the computer, the position of the object can be recognized by the place name having a small data volume, so that increasing of communication cost can be prevented.

The program for assisting simple recognition of a position according to the present invention further functions map-information request means for requesting map information corresponding to the position information fetched by the position information fetch means, of a map-information server for supplying the map information to display a map, and means for generating assistant information so as to display the map information supplied by said map-information server in accordance with request by said map-information request means, correspondingly to an order from the outside of the computer by operating said assistant information generating means.

By executing the program for assisting simple recognition of a position mentioned above, when the computer fetches position information, the computer requests the map information corresponding to the position information from a map-information server. Thereafter, the assistant information is generated so as to display the map information supplied by the map-information server in accordance with request by the map-information request means, correspondingly to the order from the outside of the computer. Thus, by executing the program for assisting simple recognition of a position on the computer, the assistant information is generated to display the map information supplied by the map-information server, so that, when some users having no feel of the place cannot recognize the position only by the place name, the map information corresponding to the position can be displayed. Therefore, users can recognize the position more securely. Furthermore, using the map information supplied by the map-information server, the program for assisting simple recognition of a position does not require installing and managing the map information, and the apparatus can be structured easily.

The program for assisting simple recognition of a position according to the present invention further functions means for generating assistant information so as to display advertisement information related to the place-name information by operating said assistant information generating means, the place-name information being related to the advertisement information indicating requested advertisement.

By executing the program for assisting simple recognition of a position mentioned above, the computer generates The assistant information to display the advertisement information related to the selected place-name information and outputs the assistant information toward, for example, a communication device to display the advertisement information on a mobile terminal, such as a cellular phone. Thus, by executing the program for assisting simple recognition of a position on the computer, the assistant information to display the advertisement information related to the place-name information is generated and the advertisement information is displayed on a mobile terminal, such as a cellular phone, so that advertisement rates can be given from an advertiser. Applying a name of a building or a company to the advertisement information and displaying the advertisement information, some users can swiftly recognize the position by the advertisement information without display of a map. Thus, the advertisement information can assist for users to recognize a position and the advertisement rates may reduce communication expenses for users.

The above and other objects and features of this invention will become more apparent from the following description taken in conjunction with the accompanying drawings.

BRIEF DESCRIPTION OF THE DRAWINGS

FIG. 4 is an explanation drawing for explaining one example of data structures of the map-information database in FIG. 2;

FIG. 5 is a block diagram showing one example of structures of a cellular phone in FIG. 2.

DETAILED DESCRIPTION OF THE PREFERRED EMBODIMENT

A preferred embodiment of an apparatus for assisting simple recognition of a position according to the present invention will be described with reference to FIG. 2 through FIG. 6.

Figure 1:
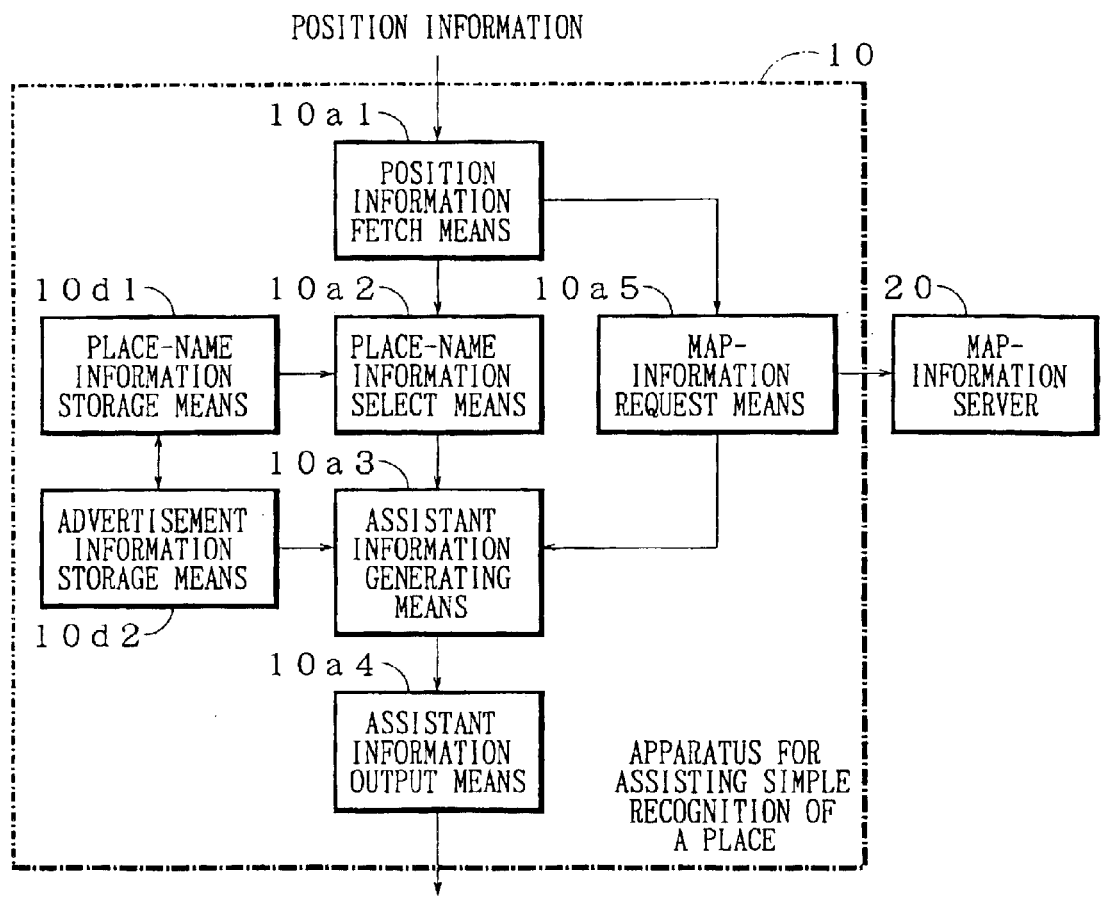
FIG. 1 is a basic diagram of an apparatus for assisting simple recognition of a position according to the present invention.
Figure 3:
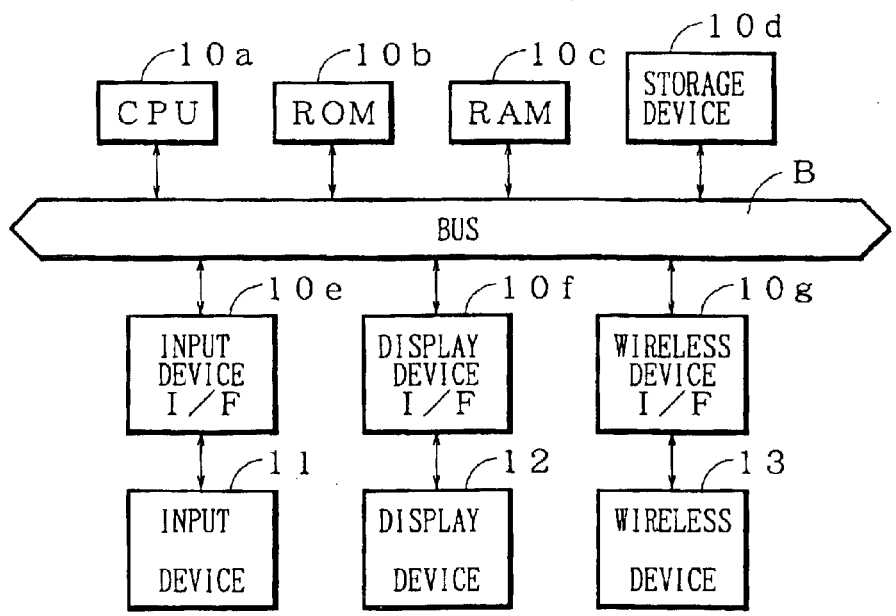
FIG. 3 is a block diagram showing one example of structures of the apparatus for assisting simple recognition of a position in FIG. 2.
Figure 2:
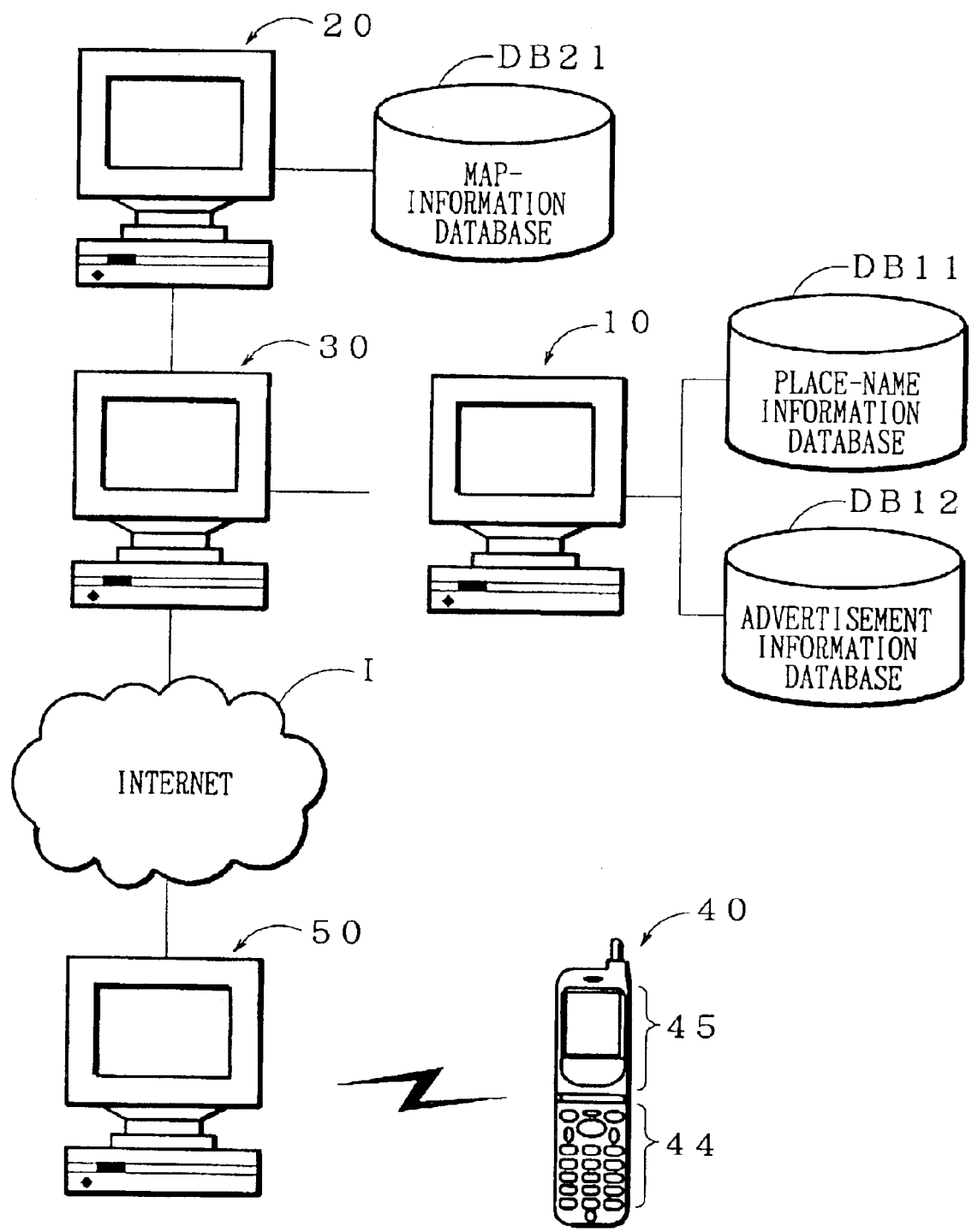
FIG. 2 is a system block diagram showing one example of systems to which the apparatus for assisting simple recognition of a position is applied.
Figure 6:
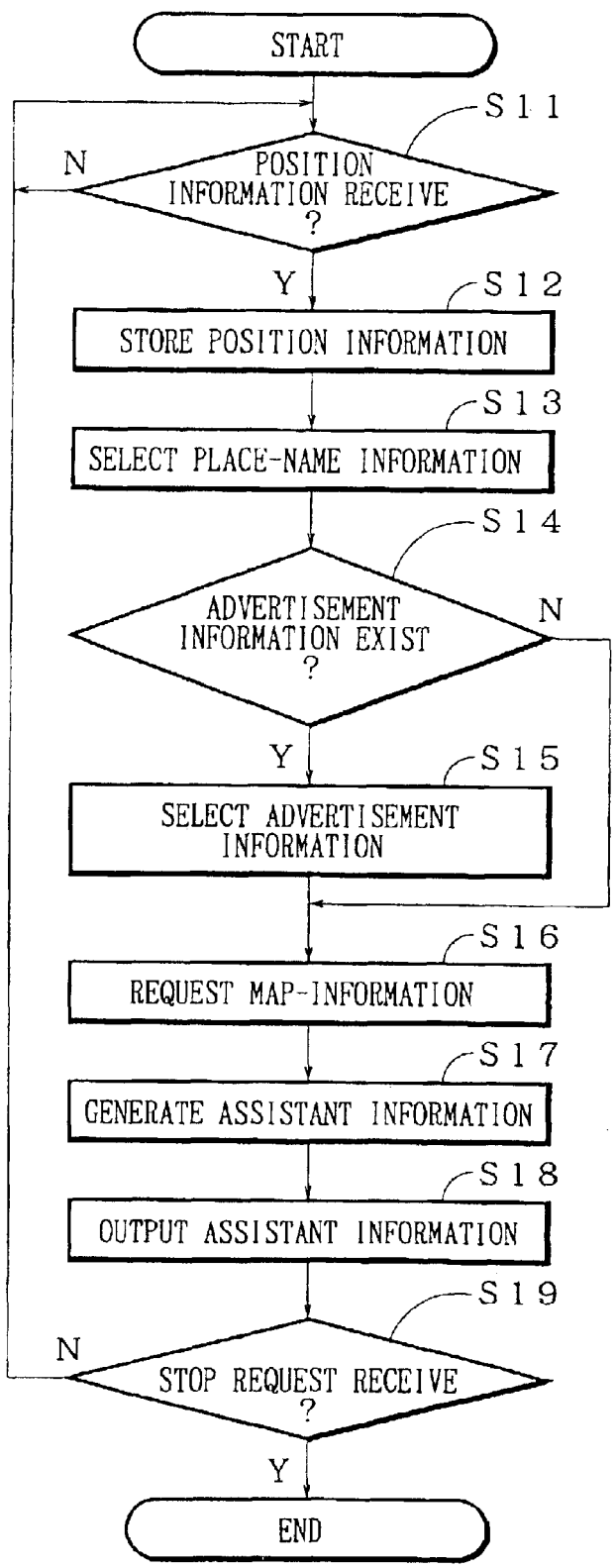
FIG. 6 is a flowchart showing one example of outlined processes on a CPU in FIG. 3.

FIG. 2 is a system block diagram showing one example of a system to which the apparatus for assisting simple recognition of a position is applied. FIG. 3 is a block diagram showing one example of a structure of the apparatus for assisting simple recognition of a position in FIG. 2. FIG. 4 is an explanation drawing for explaining one example of data structures of the map-information database in FIG. 2. FIG. 5 is a block diagram showing one example of a structure of a cellular phone in FIG. 2. FIG. 6 is a flowchart showing one example of outlined processes on a CPU in FIG. 3.

In FIG. 2, mark 10 indicates an apparatus for assisting simple recognition of a position according to the present invention and the apparatus 10 for assisting simple recognition of a position generates assistant information to assist simple recognition of a current position of an object. Mark 20 indicates a map-information server provided at a map-information distributor or the like, and the map-information server 20 supplies a map information to display a map corresponding to a pointed position and can access to a map-information database DB21. The map-information database DB21 stores map-information to display a map with a plurality of map scales on a display device.

Mark 30 indicates a known WWW (World Wide Web) server, and the WWW server 30 can communicate respectively with the apparatus 10 for assisting simple recognition of a position and the map-information server 20 by TCP/IP protocol.

Mark 40 indicates a cellular phone, and the cellular phone 40 held by a user is provided with a display portion 48a to display assistant information generated by the apparatus 10 for assisting simple recognition of a position and an operating portion 44 having a ten-key operated by the user. The cellular phone 40 is connected through Internet I and WAP (Wireless Application Protocol) gateway 50 to the WWW server 30.

The WAP gateway 50 is provided generally in a cellular phone company to exchange data with the cellular phone 40 by WAP protocol and to communicate with the WWW server 30 by TCP/IP protocol.

In detail, when the WAP gateway 50 receives a request of access to the WWW server 30 from the cellular phone 40, the WAP gateway 50 converts the protocol of the request to HTTP (Hypertext Transfer Protocol) and accesses to the WWW server 30. A content described by HTML (HyperText Markup Language) addressed from the WWW server 30 to the cellular phone 40 is interpreted regarding tag data and converted from HTML to HDML (Handheld Device Markup Language) for a cellular phone in the WAP gateway 50.

The WAP gateway 50 transmits the content to the cellular phone 40 by HDTP (Handheld Device Transfer Protocol). By executing the HDML on a micro-browser environment called by WAE (Wireless Application Environment) in the cellular phone 40, an image of the content is displayed on the cellular phone 40.

An outline of the structure of the apparatus 10 for assisting simple recognition of a position according to the present invention will be described herein. The apparatus 10 for assisting simple recognition of a position is performed by a known personal computer, shown in FIG. 3, having a central processing unit (CPU) 10a to control actions of the whole apparatus in accordance with a predetermined program. A ROM 10b of a read-only memory storing a program for the CPU 10a and a RAM 10c, which is a memory being read and written freely, having a working area to store various data necessary for process of the CPU 10a are connected through a bus B with the CPU 10a.

A storage device 10d, which may use a hard disk drive, is connected through the bus B with the CPU 10a. The storage device 10d stores a program file for operating the computer to perform as the apparatus 10 for assisting simple recognition of a position and various database.

An input device interface (I/F) 10e, a display device interface (I/F) 10f and a wireless device interface (I/F) 10g are connected through the bus B with the CPU 10a. An input device 11, such as a keyboard or a mouse, is connected to the input device I/F 10e and various input data, inputted to the input device 11, are inputted through the bus B to the CPU 10a.

A display device 12, such as a CRT or a LCD display, is connected to the display device I/F 10f. The display device I/F 10f controls a display image on the display device 12 by a command of the CPU 10a.

A wireless device 13, such as a radio communication adapter, is connected to the wireless device I/F 10g. Thereby, the apparatus 10 for assisting simple recognition of a position can communicate between the WWW server 30 by a wireless LAN. A communication system through a packet transfer network by a communication device such as a modem for a cellular phone as a wireless device can be applied.

Information with relation to the present invention, stored in the storage device 10d of the apparatus 10 for assisting simple recognition of a position, will be explained herein. The aforesaid storage device 10d stores a file of a program for assisting simple recognition of a position (not shown), a place-name information database DB11 and an advertisement information database DB12.

The file of the program for assisting simple recognition of a position has a program for assisting simple recognition of a position to operate the CPU 10a to assist simple recognition of a current position of an object so as to function position information fetch means for fetching position information to show the current position of the object sensed at an outside of the computer, place-name information select means for selecting place-name information corresponding to the position information fetched by said position information fetch means from the place-name information to indicate a place name corresponding to an each position, assistant information generating means for generating assistant information to display the place-name information selected by the place-name information select means, and assistant information output means for outputting the assistant information generated by the assistant information generating means to display the place name information.

The place-name information database DB11, as shown in FIG. 4, stores a plurality of place-name items of information to indicate a place name corresponding to each position. The each place-name information has various data, such as a place-name datum, a latitude datum, a longitude datum, an advertisement link datum and the others. The place-name datum is set with information indicating an address and a place name corresponding to each predetermined position (point by predetermined latitude and longitude). The latitude datum is set with information indicating latitude of the position corresponding to the place name. The longitude datum is set with information indicating longitude of the position corresponding to the place name. When an advertisement information related to the place-name information exist, the advertisement data is set with an address datum of a storing location of the advertisement information in the advertisement information database DB12.

In the embodiment, it will be described that predetermined latitude and predetermined longitude are set respectively in the latitude datum and the longitude datum, and when latitude or longitude corresponding to a pointed position does not exist, a place-name information of the closest position to the pointed position is selected. The present invention does not limit the embodiment, and various changes and modifications can be made. For example, by setting latitude and longitude with predetermined ranges or setting latitude and longitude finely, a placename information corresponding to a pointed position can be selected securely.

The advertisement information database DB12 stores a plurality of advertisement items of information to display an advertisement requested by an advertiser. Each of the items of advertisement information to be advertised at the corresponding position is related respectively to the place-name information by the advertisement link datum of the place-name information. The advertisement information, for example, "near DASIS co. ltd.", "near ABC distribution center" or "XYZ Interchange", is set and can be displayed only itself or together with the place-name information.

As mentioned above, the storage device 10d stores the place-name database DB11 including place-name information and the advertisement information database DB12 including advertisement information so that the storage device 10d performs place-name information storage means and advertisement information storage means described in the present invention.

In the embodiment, various files of the program for assisting simple recognition of a position, place-name information database DB11 and advertisement information database DB12 are installed into the storage device 10d through a storage medium, such as a CD-ROM or MO, which the computer can read. The present invention does not limit the embodiment, and by providing a communication interface in the computer, installation of the files can be accomplished by downloading the files through data communication with a telephone line or Internet. Thus, various changes and modifications can be made.

The cellular phone 40 mentioned above has a function of a GPS, and includes a CPU 41, a ROM 42, a RAM 43, an operating portion 44, a communicating portion 45, a voice processing portion 46, a calling sound generator 47, a display controller 48 controlling a display portion 48a and a GSP receiver 49, as known.

When the communicating portion 45 receives various information such as assistant information by HDML format from the WAP gateway 50, the CPU 41 executes HDML on the micro-browser environment to be called WAE, and outputs the assistant information to the display controller 48. The display controller 48 controls the display portion 48a to display the assistant information so that the assistant information is displayed on the display portion 38a.

The CPU 41 requests, for example, periodically a current position information based on a received radio signal by the GPS receiver to the GPS receiver 49 to define a location information indicating a location of a searcher having the cellular phone 40 by the position information. The CPU 41 outputs the location information to the communicating portion 45 and the communicating portion 45 transmits the location information through Internet I to the apparatus 10 for assisting simple recognition of a position. A position sensing method of the GPS receiver 49 uses a known normal GPS system, and measuring times required for radio waves to reach from more-than-three GPS satellites to the GPS receiver 49 so that the position of the GPS receiver 49 is calculated securely.

An embodiment of an outline process of the CPU 10a to perform as the apparatus 10 for assisting simple recognition of a position by the program for assisting simple recognition of a position of the file of the program for assisting simple recognition of a position, mentioned above, will be explained with reference to a flowchart in FIG. 6. Following processes are stopped by a stop command of an upper module.

In step S11 of FIG. 6, it is judged whether or not the computer receives position information from the cellular phone 40 of user. When it is judged that the position information is not received (N in the step S11), this process of judging is repeated to wait for the position information. When it is judged that the position information is received (Y in the step S11), the process goes to step S12.

In the step S12 (position information fetch means), the received position information is stored in the RAM 10c, and in step S13 (place-name information select means), the place-name information corresponding to the position information is selected from the place-name database DB11 and stored in the RAM 10c, and then the process goes to step S14. A place-name information corresponding to a latitude datum and a longitude datum of the position information or a place-name information in a vicinity of the position is searched and a searched place-name information is selected as the place-name information corresponding to the position information.

In step S14, it is judged that advertisement information exists or not based on advertisement link datum of the selected place-name information. When it is judged that no datum is set in the advertisement link datum, i.e., no advertisement information exists (N at the step S14), the process goes to step S16.

When it is judged in the step S14 that a datum is set in the advertisement link datum, i.e., advertisement information exists (Y at the step S14), advertisement information related with the advertisement link datum of the place-name information is selected from the advertisement information database DB12 and stored in the RAM 10c in step S15. Thereafter, the process goes to step S16.

In the step S16 (map-information request means), a map-information request for requesting a map information corresponding to the position information stored in the RAM 10c. The map-information request is outputted to a wireless device I/F 10g to be addressed to the map-information server 20 and then process goes to step S17. The map-information request inputted to the wireless device 13 is transmitted through the WWW server 30 to the map-information server 20.

The map-information request includes various data, for example, latitude and longitude of position information on the center of the map, a size and scale of the map, storage address for storing the map information and a file name. The present invention is not limited to the above, and various modifications can be considered correspondingly to system specification.

In the step S17 (assistant information generating means), assistant information to display the selected place-name information in the RAM 10c is generated, for example, by HTML format so as to display the map information supplied by the map-information server 20 in accordance with the map-information request, correspondingly to an order from the outside of the computer. When advertisement information exists, assistant information is generated to display the advertisement information. Thereafter, in step S18 (assistant information output means), the assistant information is outputted to the wireless device I/F 10g to be addressed to the WWW server 30 and then the process goes to step 19. The assistant information inputted to the wireless device 13 is transmitted to the WWW server 30.

For an example of assistant information mentioned above, when "ABC street, XYZ city" is set in the place-name information corresponding to the received position information and "near DASIS co. ltd." is set in the advertisement information related to the place-name information, the assistant information is generated to display "ABC street, XYZ city, near DASIS co. ltd." combined with the place-name information and the advertisement information. Various embodiments of the assistant information can be considered for example to display only advertisement of "near DASIS co. ltd." or only place-name information "ABC street, XYZ city" so as to display selectively the advertisement information as link information by a user.

In the step S19, it is judged whether or not a stop request is received. When it is judged that the stop request is not received (N at the step S19), the process returns to the step S11 and whole processes are repeated. When it is judged that the stop request is received (Y at the step S19), the process is stopped.

Thus, in the embodiment mentioned above, the CPU 10a of the apparatus 10 for assisting simple recognition of a position functions position information fetch means, place-name information select means, assistant information generating means, assistant information output means and map-information request means.

One example of actions between the apparatus 10 for assisting simple recognition of a position according to the aforesaid present invention and the cellular phone 40 will be described herein.

When position information is calculated with radio waves received by the GPS receiver 49 in the cellular phone 40, display request for requesting to display the position by the position information is generated. The display request is outputted to the communicating portion 45 and transmitted through Internet I to the WWW server 30. Thereby, the display request is transferred from the WWW server 30 to the apparatus 10 for assisting simple recognition of a position.

When the display request received by the wireless device 13, i.e., position information of the display request, is fetched in the apparatus 10 for assisting simple recognition of a position, the place-name information corresponding to the position information is selected from the place-name information database DB11. Advertisement information is also selected from the advertisement information database DB12 when the advertisement information is related to the position information. When map-information request for requesting map-information corresponding to the fetched position information is generated, the map-information request is transmitted through the WWW server 30 to the map-information server 20.

When the map-information request is received in the map-information server 20, map information with requested size and scale at the center of the position by the map-information request is selected from the map-information server DB21. The map information is transferred to be stored in a storage address of the map-information request.

Thereafter, assistant information is generated in the apparatus 10 for assisting simple recognition of a position by the selected place-name information, the advertisement information related to the place-name information and the storage address pointed by the map-information request, and the assistant information is transmitted to the WWW server 30. The assistant information is transmitted from the WWW server 30 to the WAP gateway 50 for the cellular phone 40. The HTML-formatted assistant information addressed from the WWW server 30 to the cellular phone 40 is interpreted regarding tag data and converted from HTML to HDML (Handheld Device Markup Language) for a cellular phone in the WAP gateway 50.

The WAP gateway 50 transmits the converted assistant information to the cellular phone 40 by HDTP. By executing the HDML on a micro-browser environment called by WAE in the cellular phone 40, an image of the place name and advertisement by the assistant information generated in the apparatus 10 for assisting simple recognition of a position is displayed on the display portion 48a. Thereby, the user can recognize the current position with the display.

When the current position cannot be recognized with the display of the place name and the advertisement, selecting an item of "display map" on the display by operating the operating portion 44, map information selected in the map-information server 20 and stored in the storage address is received through the WWW server 30, and displayed on the display portion 48a. Thus, the user can recognize the current position with the map information.

As mentioned above, in the apparatus 10 for assisting simple recognition of a position, selecting the place-name information corresponding to the position information sensed at the cellular phone 40 (outside of the apparatus), generating the assistant information with the selected place-name information, and outputting the assistant information to display the place-name information on the display portion 48a of the cellular phone 40, a user can recognize the current position by displaying the assistant information. Especially, some users having the feel of the place, i.e., requiring no display of a map, can recognize the position of the object swiftly by the place name. Furthermore, the assistant information generated with the place name has a small data volume so that there is no issue of increasing communication cost. Regarding even cellular phone with a small display, the current position can be easily recognized by the place name.

Thus, the position of the object can be recognized easily by the place name having a small data volume, so that increasing of communication cost can be prevented. The data volume to display the place name is smaller than the data volume to display a map image, so that response time to display information correspondingly to a request by a user can be shortened.

Furthermore, the assistant information is generated to display the map information supplied by the map-information server 20, so that, when the other users having no feel of the place cannot recognize the position only by the place name, the map information corresponding to the position can be displayed. Therefore, users can recognize the position more securely. Furthermore, using the map information supplied by the map-information server 20, the apparatus 10 for assisting simple recognition of a position is not required to manage the map information and the apparatus can be structured easily.

Furthermore, generating the assistant information to display advertisement information related to the place-name information, the advertisement information can be displayed on the display portion 48a of the cellular phone, so that advertisement rates can be given from an advertiser. Applying a name of a building or a company to the advertisement information and displaying the advertisement information, some users can swiftly recognize the position by the advertisement information without display of a map. Thus, the advertisement information can assist for users to recognize a position and the advertisement rates may reduce communication expenses for users.

As the above-mentioned embodiment of the present invention, it is described that the apparatus 10 for assisting simple recognition of a position generates the assistant information by receiving the position information sensed at the cellular phone 40. The present invention is not limited to the above, and various embodiments can be considered.

For example, the apparatus 10 for assisting simple recognition of a position may have databases for member information indicating predetermined members and vehicle information indicating vehicles owned by the member. An on-vehicle device for transmitting position information to indicate the current position of the vehicle toward an outside of the vehicle is installed in the vehicle and the on-vehicle device is managed with relation to the vehicle information.

When the apparatus 10 for assisting simple recognition of a position receives a request command from a mobile terminal, such as a cellular phone held with the member, the apparatus 10 receives position information from the on-vehicle device installed in the vehicle, and generates assistant information corresponding to the position information as same as aforesaid embodiment, and displays the assistant information on the mobile terminal of the member. In this embodiment, the vehicle is an object and the member can recognize the current position of the vehicle of the member from a distant place.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. An apparatus for assisting simple recognition of a position to assist simple recognition of a current position of an object comprising:

place-name information storage means for storing place-name information to indicate a place name corresponding to each position;

position information fetch means for fetching position information to show the current position of the object sensed at an outside of said apparatus;

place-name information select means for selecting the place-name information corresponding to the position information fetched by said position information fetch means from said place-name information storage means;

assistant information generating means for generating assistant information to display the place-name information selected by said place-name information select means; and assistant information output means for outputting the assistant information generated by said assistant information generating means to display said place-name information.

2. The apparatus for assisting simple recognition of a position according to claim 1, further comprising map-information request means for requesting map information corresponding to the position, shown by said position information fetched by said position information fetch means, from a map-information server for supplying the map information to display a map, wherein said assistant information generating means generate the assistant information to display the map information supplied by said map-information server in accordance with request by said map-information request means, correspondingly to an order from the outside of the apparatus.

3. The apparatus for assisting simple recognition of a position according to claim 1 or 2, further comprising advertisement information storage means for storing advertisement information to indicate requested advertisement related to the place-name information stored in said place-name information storage means, wherein said assistant information generating means generate the assistant information to display said advertisement information related to the place-name information.

4. A computer-readable medium for assisting simple recognition of a position, for operating a computer to assist simple recognition of a current position of an object, comprising:

position information fetch means for fetching position information to show the current position of the object sensed at an outside of said computer;

place-name information select means for selecting place-name information corresponding to the position information fetched by said position information fetch means from the place-name information to indicate a place name corresponding to an each position;

assistant information generating means for generating assistant information to display said place-name information selected by said place-name information select means; and assistant information output means for outputting the assistant information generated by said assistant information generating means to display said place-name information.

5. The computer-readable medium for assisting simple recognition of a position according to claim 4, further comprising map-information request means for requesting map information corresponding to the position, shown by said position information fetched by said position information fetch means, of a map-information server for supplying the map information to display a map, and means for generating assistant information so as to display the map information supplied by said map-information server in accordance with request by said map-information request means, correspondingly to an order from the outside of the computer by operating said assistant information generating means.

6. The computer-readable medium for assisting simple recognition of a position according to claim 4 or 5, further comprising means for generating assistant information so as to display advertisement information related to the place-name information by operating said assistant information generating means, the place-name information being related to the advertisement information indicating requested advertisement.

* * * * *